United States Patent [19]

Young

[11] 4,255,221
[45] Mar. 10, 1981

[54] SURFBOARD AND METHOD AND APPARATUS FOR MAKING SURFBOARDS AND LIKE MOLDED STRUCTURES

[76] Inventor: Gary W. Young, Box 754, Marshall, Calif. 94940

[21] Appl. No.: 967,777

[22] Filed: Dec. 8, 1978

[51] Int. Cl.³ .............. B32B 31/00; B28B 21/36; B29C 17/04; A63C 5/00
[52] U.S. Cl. .................. 156/382; 9/310 E; 100/211; 144/309 Q; 264/553; 264/571; 425/389; 425/504
[58] Field of Search ............. 156/443, 382; 264/510, 264/553, 571; 425/389, 504; 100/211; 144/256, 281 A, 281 E, 309 B, 309 Q

[56] References Cited

U.S. PATENT DOCUMENTS

| 2,923,978 | 2/1960 | Corzine | 264/571 |
|---|---|---|---|
| 2,990,872 | 7/1961 | Gaby | 100/93 P |
| 3,878,015 | 4/1975 | Johnston | 428/179 |
| 3,972,766 | 8/1976 | Fontvieille | 156/382 |
| 3,993,527 | 11/1976 | Ohta | 156/245 |
| 4,062,917 | 12/1977 | Hill et al. | 425/389 |
| 4,148,645 | 4/1979 | Gates | 264/553 |

Primary Examiner—William R. Dixon, Jr.
Attorney, Agent, or Firm—Flehr, Hohbach, Test et al

[57] ABSTRACT

A surfboard having a central core of relatively soft and/or light material such as balsa wood or foamed plastic and a laminated outer skin construction is disclosed herein along with a method and apparatus for making the surfboard or a similar article. Both the method and apparatus utilize particular vacuum molding techniques which form the laminated outer skin constructions while at the same time accurately conforming this skin construction to the complex curvatures of the core.

12 Claims, 13 Drawing Figures

SURFBOARD AND METHOD AND APPARATUS FOR MAKING SURFBOARDS AND LIKE MOLDED STRUCTURES

BACKGROUND OF THE INVENTION

The present invention relates generally to composite articles such as surfboards and the like having an inner core and outer skin construction and more particularly to a method of and apparatus for making such an article.

There are many surfboards today which are constructed with an inner shaped core of balsa wood or plastic foam and an outer skin construction. Typically, this skin construction is in the form of laminated strips or layers of fiberglass material impregnated with polyester resin or the like. Surfboards constructed in this manner are easily dented or fractured in that the wood or foam core is too soft whereas the outer fiberglass layer is too brittle especially on the edges of the surfboard. In addition, surfboards of this type do not provide the same aesthetic appeal, as for example a surfboard which utilizes an outer wood laminate as part of its skin construction. There have been no "outer wood laminate" surfboards constructed that have had the wood laminate formed to the curvatures of shape of a particular, one-of-a-kind surfboard. Previously hollow wooden surfboards have had top and bottom relatively flat constructions of plywood with relatively square edges. However, surfboards of this latter type have disadvantages in terms of excess weight and insufficient resiliency and, in the past, have been difficult to construct economically and reliably in the variety of complex shapes that are typical of modern surfboards demanded by today's sophistacated surfer.

As will be seen hereinafter, the present invention is directed to a surfboard or other such article having a relatively soft and/or light core and an outermost decorative wood veneer. However, as will also be seen, this surfboard or other such article is constructed economically and in an uncomplicated and reliable way and yet in a way which provides an accurately defined predetermined outer curvature, and provides a greater impact strength, especially along the edges or corners of such article. It should be noted that presently modern surfboards which are satisfactory to the sophisticated surfer are predominately hand shaped, each core having a substantially unique design of compound curves and dimensions. Even surfboards of the same outside dimensions and outline can have subtle but completely different types of edge curves and roundnesses all of which affect the riding characteristics of the surfboard.

OBJECTS AND SUMMARY OF THE INVENTION

One object of the present invention is to provide an uncomplicated apparatus for making a surfboard or other such article of predetermined curvature and having a central core of relatively soft and/or light material such as balsa wood or foamed plastic or a light weight core constructed of wood or paper and a laminated outer skin construction.

Another object of the present invention is to provide an apparatus capable of reliably and accurately conforming the outer skin construction of the article to the curvature of its core in an uncomplicated and economical way including forming two opposite sides of shaped object simultaneously.

Still another object of the present invention is to utilize the same apparatus for articles including cores having slightly different or significantly compound curvatures.

Yet another object of the present invention is to provide an apparatus which conforms the laminated skin construction of the article to its inner core by means of vacuum and which utilizes vacuum distribution tubing which can be periodically cleaned internally for continued operation without requiring a new tubing.

A further object of the present invention is to provide a method of making the surfboard or similar article as just recited in an uncomplicated, economical and reliable manner, taking advantage of the features just recited while minimizing waste and labor.

Still a further object of the present invention is to provide a method of making the surfboard or similar article in a way which reduces the weight of its core without otherwise effecting the strength of the article itself.

Yet a further object of the present invention is to provide a method of more reliably providing the laminated outer skin construction while minimizing the existence of internal air bubbles and excess laminating adhesive.

Still a further of the present invention is to form the outer skin construction in a particular way utilizing the materials selected to maximize its strength.

As will be seen hereinafter, the specific surfboard constructed in accordance with the present invention is one which includes a longitudinally extending central core of relatively soft and/or light material such as balsa wood or foamed plastic and a laminated outer skin construction surrounding the core. The outer skin construction in this preferred embodiment includes an outermost wood veneer layer, an intermediate adhesive impregnated reinforcement cloth and one or more innermost wood veneer layers. While the grain of the outermost wood veneer runs in a pre-determined direction with the core, for purposes of strength, the grain of at least each innermost wood veneer runs diagonally or perpendicular with the other and at least one will run at an angle with the grain of the outermost layer. In a preferred embodiment, the innermost wood layers are perforated so as to minimize the inclusion of air bubbles and excess adhesive within the laminated outer skin during the manufacturing process and allow any remaining air or excess adhesive to escape from between the laminate layers. In addition, the central core is chambered from one surface in order to reduce its weight.

The particular apparatus utilized to fabricate the surfboard just described as well as other laminated articles of predetermined curvature includes a housing which defines a vacuum chamber adapted to receive the central core and an outer skin construction and which has outermost flexible wall means defining opposite sides of this chamber. The apparatus also includes means for creating a vacuum in the chamber whereby to draw the flexible wall means tightly around the core and outer skin construction on opposing sides simultaneously. This, in turn, causes the latter to conform to the curvature of the core so as to provide the same curvature for the article itself. In addition, in accordance with a preferred embodiment of the present invention, the apparatus provide means located outside and on one side of the chamber for aiding the flexible wall means in causing a section of the skin construction to conform to a predetermined one of the curved surfaces of the core. In an actual working embodiment, this curvature aiding means includes at least one support member which is preferably mobile and hence easily removable but which, in any event, is sufficiently bendable to define a plurality of different curvatures in a given plane including the predetermined curved surface of interest and means for bending the member to and maintaining it in any one of these curvatures. As will be seen hereinafter, this bendable member not only aids in the curvature process but it also helps to confirm that the particular curvature of interest has not inadvertently deviated from its initial design during the overall fabricating process.

DETAILED DESCRIPTION

Figures 1, 1A, 2:
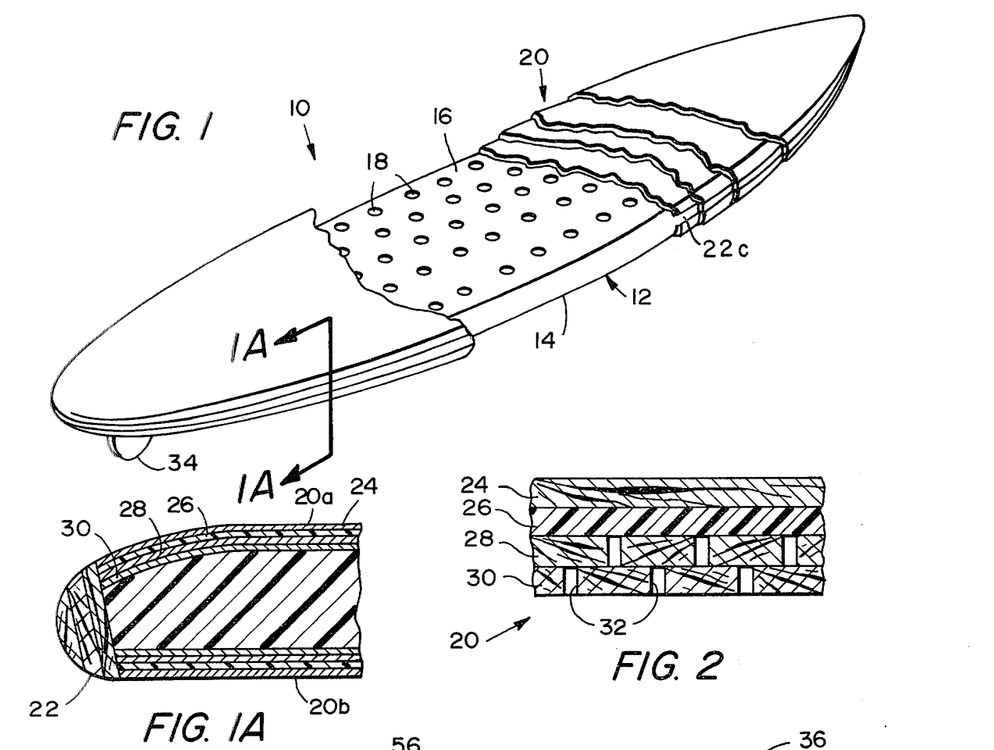
FIG. 1 is a perspective view of a surfboard constructed in accordance with the present invention and partially broken away to illustrate its central core and laminated skin construction.
FIG. 1A is a sectional view taken generally along line 1A—1A in FIG. 1.
FIG. 2 is an enlarged cross-sectional view of the laminated skin construction comprising part of the surfboard of FIG. 1.

Turning now to the drawings, wherein like components are designated by like reference numerals throughout the various figures, attention is specifically directed to FIG. 1 which illustrates a surfboard constructed in accordance with the present invention. This surfboard which is generally designated by the reference numeral 10 includes a central core 12 shaped and formed in a conventional fashion from a relatively soft and/or light material, preferably balsa wood or foamed plastic. As seen in FIG. 1, this core which extends longitudinally defines a predetermined curvature including a curved underside 14 and top side 16. In a preferred embodiment, one side is chambered, that is, provided with openings 18 therein, thereby reducing the overall weight of the core. The bottom could be chambered in addition to or in lieu of the top side as shown.

Surfboard 10 also includes a laminated skin construction 20 which extends from edge to edge on both top and bottom sides of core 12, specifically conforming to the curvature of the core so that the surfboard itself displays the same predetermined curvature. As will be seen hereinafter, this laminated outer skin construction is provided around core 12 in two sections, a bottom section 20a and a top section 20b. As best seen in FIG. 1A, the top and bottom laminated skins 20a and 20b, respectively, are formed around the edges of the core 12 and are planed smooth to receive a third laminated wood edge finish strip 22 which after lamination is then shaped to conform to the outlying curvatures to provide continuity of curvature between the top and bottom skins. The edges could be finished in several ways including but not limited to overlapping the top and bottom skins at the edges, forming by means of vacuum thin layers of wood veneer, epoxy impregnated, over the top and bottom laminated skins or covering with any laminated fiberous material which will conform to the curvatures required and provide sufficient strength for its weight.

As best seen in FIG. 2, the laminated outer skin construction 20 is made up of four individual layers of material, an outermost layer 24, an intermediate layer 26 and two innermost layers 28 and 30, respectively. In the embodiment illustrated, the outermost layer is a decorative wood veneer having its grain run in a pre-determined direction of core 12, that is, substantially parallel to edge 20c. This wood veneer may be of any suitable type such as mahogany, oak, teak, rosewood, etc. In an actual working embodiment it is 1/28-1/64th" thick. Layer 26 is a reinforcement cloth or fiber capable of being impregnated by an adhesive, preferably NYLON cloth. In an actual working embodiment, this reinforcement cloth is impregnated with an epoxy resin glue. The last one or more layers 28 and 30 are also wood veneers which in a preferred embodiment are structural layers approximately 1/32nd" to 1/64th" inch thick. In addition, in this preferred embodiment, the grains in the one or more innermost layers 28 and 30 run diagonally with one another at acute angles with the grain of the outermost layer or perpendicular to the outermost layer 24 whereby to add strength to the overall skin construction. In addition, in this same preferred embodiment, the one or more innermost layers are punctured as indicated at 32 to allow air and excess epoxy within the nylon cloth and between adjacent layers to escape through these punctured openings and into the core or to edge 20c during the fabricating process to be described hereinafter. In this regard, if the core material is sufficiently porous, it will pass much of the air and possibly some of the excess epoxy during application of a vacuum. The air and excess epoxy can also pass between the core and innermost layers 28 and 30 towards edge 20c.

Surfboard 10 has been described thus far as including those features necessary to the present invention. The surfboard may also include other components such as a fin 34 which is mounted to the underside of the outer skin construction. Moreover, the various features of the present invention incorporated in the surfboard as illustrated in FIG. 1 may be readily incorporated into other laminated articles including an inner core and a laminated outer skin construction such as the main body of a wind surfboard, water skis, luggage, furniture or the like. Obviously, these articles might include other components not illustrated.

Having described surfboard 10, attention is now directed to a particular apparatus which is utilized in constructing the surfboard in an uncomplicated, reliable and economical way and particularly a way which provides the simultaneous formation of the skins against and conforming to the curvatures of the core. In this regard, the core itself is manufactured in a conventional manner by conventional apparatus (not shown) so as to display specific curvature on its underside 14 and its top side 16. However, a suitable drill or punch press (also not shown) may be utilized to chamber the top side (or both sides), thereby providing openings 18 and reducing its weight and to allow passage of air and excess epoxy during lamination, as stated above. Thereafter, the two sections 20a and 20b of laminated outer skin construction 20 are impregnated with adhesive, specifically the epoxy resin glue referred to above and positioned around the underside and top side of the core. The apparatus to be described with respect to FIGS. 3 to 11 serves to simultaneously conform the two outer skin sections to these segments of the core and, as will be seen, is particularly accurate in carrying this out along the underside of the surfboard where the degree of accuracy of conformance of the skins to the core is critical to the final shape of the surfboard. While the apparatus simultaneously maintains the two outer skin sections tightly around the compound curvatures of the core, the entire structure can be heated to cure the epoxy and bond the individual layers while, at the same time, bonding the entire laminated structure to the core.

Figure 3:
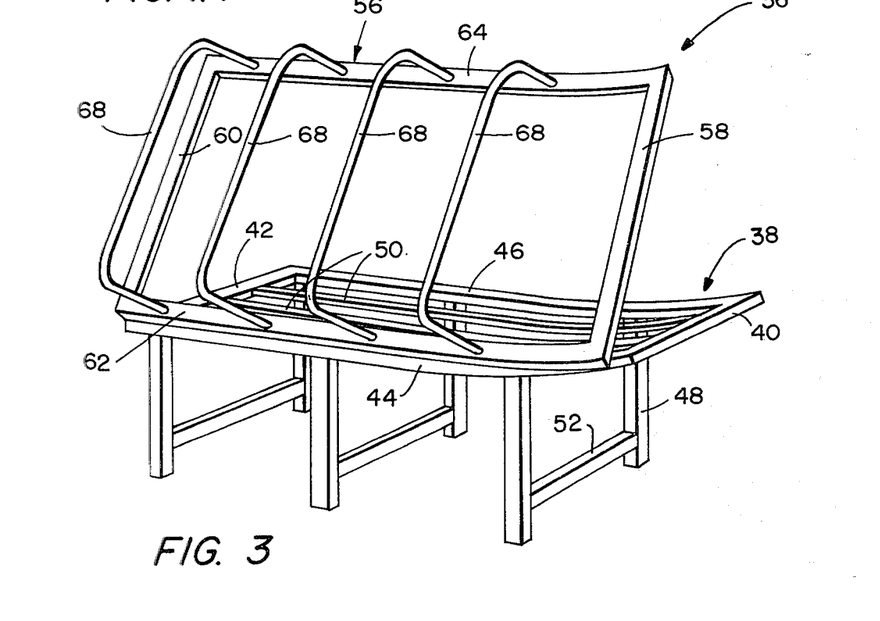
FIG. 3 is a perspective view of an apparatus which is designed in accordance with the present invention for making the laminated surfboard illustrated in FIG. 1 or similar article and which, for purposes of clarity, has been illustrated in this figure with certain features omitted therefrom.

Turning to FIGS. 3-11, various aspects of the apparatus just described are illustrated. This apparatus is generally designated by the reference numeral 36 and includes an overall frame structure which, for purposes of clarity, is illustrated in FIG. 3 without many other features of the apparatus. The frame structure includes a somewhat rectangular underframe 38 comprised of horizontally extending end runners 40 and 42 connected together by siderunners 44 and 46 which extend horizontally from runner 40 towards runner 42 but curve upward just before reaching the latter. This overall underframe is held in place above ground by a plurality of vertically extending legs 48 fixed at their top ends to the side runners.

For reasons to be discussed hereinafter, underframe 38 attaches to one or more adjustable support members 50 which are sufficiently bendable to define a plurality of different curvatures in a given plane, specifically in a vertical plane, including the curvature of core underside 14. While not shown, the entire adjustable support member assembly including members 50 may be removed to be adjusted to the curvature of core 14 at a separate location. As illustrated in FIG. 3 (and perhaps best in FIG. 5) these adjustable bendable support members extend from points adjacent but spaced from end runner 40 to points just short of end runner 42 in directions parallel to and between side runners 44 and 46. Located below these bendable members 50 is a network of rigid support bars including bars 52 which extend in the cross direction relative to the underframe between aligned legs 48 and bars 54 which run parallel to and directly under the adjustable bendable support members between cross bars 52. This overall network is removable and while attached to the frame legs 48 serves to reinforce the overall underframe and, in addition, as will be seen hereinafter, the rigid support bars 54 in particular serve to support a number of arrangements or mechanisms for actually supporting each adjustable support member 50 and controlling the way in which each member bends.

Figure 5:
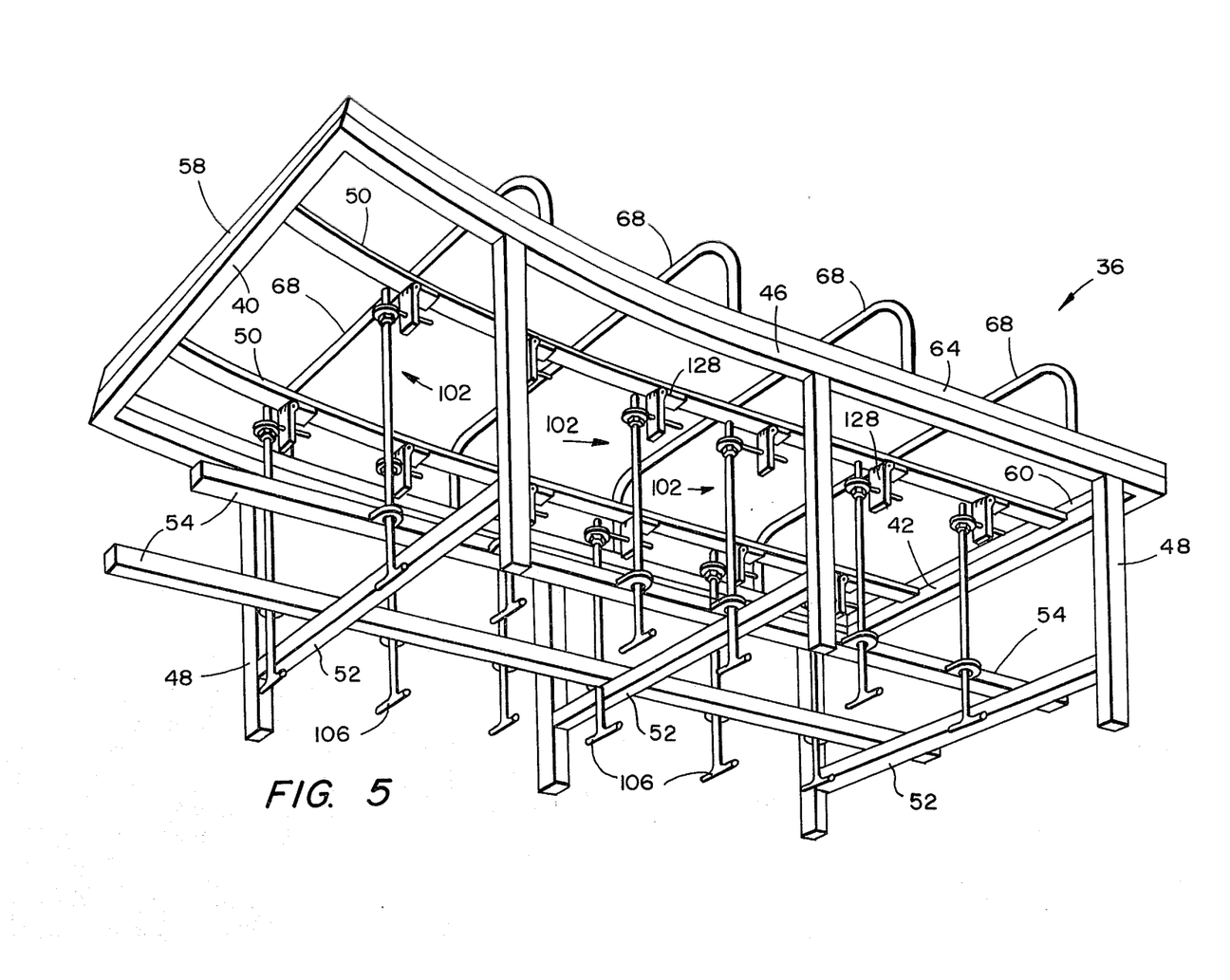
FIG. 5 is a perspective view of the apparatus illustrated in its operating position and including a number of features not shown in FIGS. 3 and 4.
Figure 6:
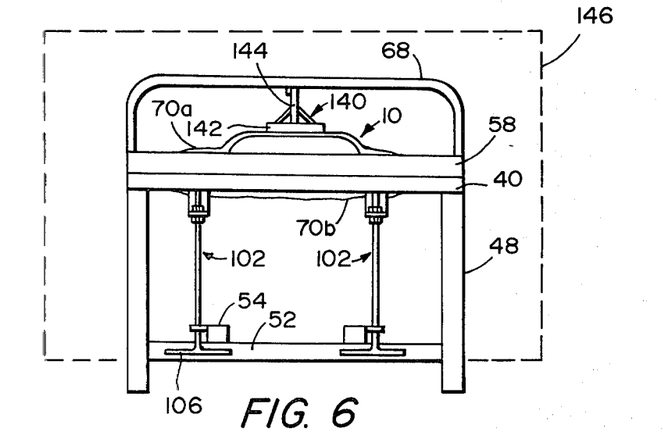
FIG. 6 is an end elevational view of the apparatus of FIG. 5.

The overall frame structure making up apparatus 36 also includes a topframe 56 which is somewhat rectangular in shape, actually complimentary to frame 38 and, therefore, includes interconnected end runners 58 and 60 and side runners 62 and 64. As seen best in FIGS. 3 and 6, the side runner 62 is hinge mounted to the side runner 44 of underframe 38 by suitable hinges 66 so that the entire top frame is pivotally movable between (1) an elevated or raised position illustrated in FIG. 3 for access into the underframe and to allow insertion or removal of surfboard and (2) a lowered or closed position as illustrated in FIGS. 5 and 6. When the topframe is in its closed position, the two frames rest against one another along their entire peripheries, that is, the end runners and side runners of one engage against the end and side runners of the other.

As will be seen below, the two frames thus far described comprise part of an overall housing which defines a vacuum chamber when the frames are closed. In order to prevent the two side runners 62 and 64 from being drawn towards one another during the vacuum pulling process, reinforcement bars 68 are applied across these runners and fixedly connected thereto. Similar reinforcement bars are not necessary across the runners 44 and 46 of the underframe since the latter is adequately reinforced by means of the previously described bendable adjustable support bar assembly 52 and 54.

Figure 7:
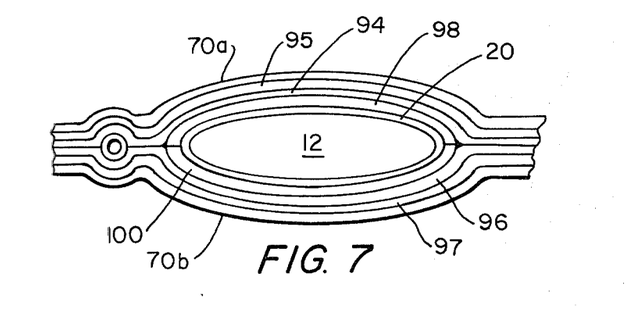
FIG. 7 is an enlarged cross-sectional view of one section of the apparatus, particularly a section which defines a vacuum chamber.
Figure 8:
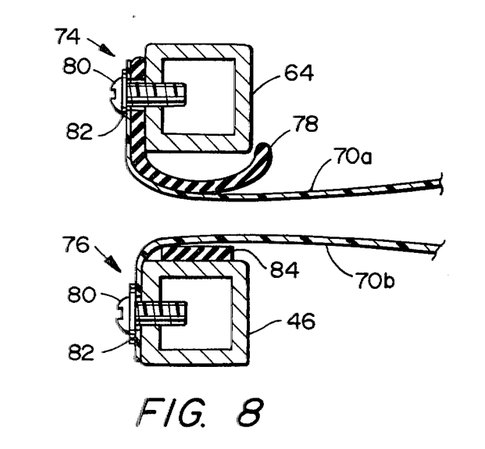
FIG. 8 is a cross-sectional view of a section of the apparatus, particularly illustrating how the vacuum chamber illustrated in FIG. 7 is vacuum sealed.

As illustrated best in FIGS. 6 to 8, the overall housing also includes a flexible top wall 70a constructed of suitable flexible vacuum tight material which extends entirely across the opening through topframe 56 and, as will be seen, is seal-connected along the entire periphery of the latter. A similar flexible wall 70b extends across the opening in underframe 38 and is seal-connected along its entire outer periphery. In this way, a sealed chamber 72 is provided between the two frames and the flexible walls. In a preferred embodiment, the material making up these flexible walls is polyvinyl acetate sheet material which is about 6 mils thick or other suitable flexible plastic materials of various thicknesses such as 1/16" thick polyethelyne.

As stated above, each of the flexible walls 70a and 70b is seal-connected around the outer periphery of its associated frame. This is best illustrated in FIG. 8 where one runner of the topframe, for example runner 64, and one runner of the underframe, for example runner 46, are illustrated in cross-section. As seen in this figure, the outermost periphery of flexible wall 70a is connected with runner 64 (and the rest of the runners making up the topframe) by means of a seal arrangement 74 while the outer periphery of flexible wall 70b is connected with runner 46 (and the rest of the runners of the underframe) by means of a seal arrangement 76. Seal arrangement 74 includes a slit polyvinyl tubing 78 approximately ¾" in diameter extending around the runners of the topframe and attached thereto by means of sheet metal screws 80 (only one of which is shown). The slit vinyl tubing may take the form of a single continuous tubing or it may be separated into sections. In any event, as illustrated in FIG. 8, the outer peripheral edge of flexible wall 70a extends over tubing 78 and along its outer edge and is attached thereto by means of retaining strips 82 held in place against the outer edges of the runners by the sheet metal screws 80. Arrangement 76 may be identical to arrangement 74. However, as illustrated in FIG. 8, this arrangement preferably includes a flexible compound 84, for example silicone rubber or sealant tape, in lieu of the slit vinyl tubing. This flexible compound extends along the entire length of the underframe of the top sides of the runners. The flexible wall 70b extends over this flexible compound and is attached thereto in the same manner as wall 70a, that is, with sheet metal screws 80 and strips 82.

Figure 4:
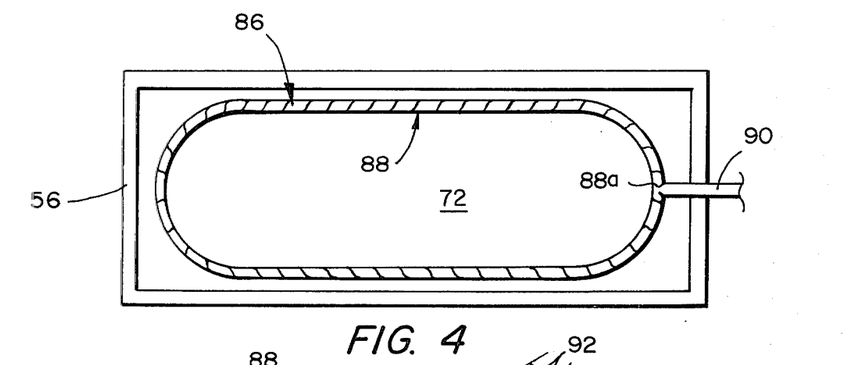
FIG. 4 is a plan view of the apparatus illustrated in FIG. 3, however with the apparatus being located in its operating position and including certain features not illustrated in FIG. 3.
Figure 4A:
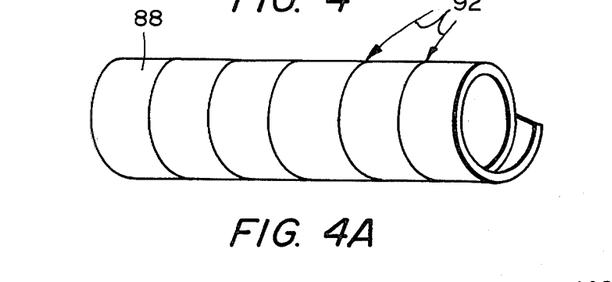
FIG. 4a is a perspective view of a vacuum distribution tubing constructed in accordance with the present invention and comprising part of the apparatus illustrated in FIGS. 3 and 4.

The seal arrangements just described provide a continuous seal between the two flexible walls around the entire topframe and underframe. This should be apparent from FIG. 8. More specifically, when the topframe is lowered against the underframe, the slit vinyl tubing 78 is caused to press against the flexible compound 84. This causes those sections of the flexible walls therebetween to be compressed together sufficient to seal the chamber 72. In order to pull a vacuum within the chamber, apparatus 10 includes a vacuum distribution (bleeder) tubing 86 which, as best illustrated in FIG. 4, includes a circumferential section 88 located entirely within chamber 72 and extending along the entire periphery thereof. With the exception of a small solid tubing segment 88a, the entire tubing section 88 is helically slit along its length as best illustrated in FIG. 4a. The reasons for this will be discussed hereinafter. As seen in FIG. 4, the overall distribution tubing includes an outlet tube 90 which is connected to and in fluid communication with solid segment 88a and which extends outside the vacuum chamber through flexible wall 70a where it is attached to a conventional source of vacuum (not shown). Obviously, at the point where the tube 90 passes through the flexible wall 70a, an appropriate seal is required. Sealant tape similar to 84, can be used to this end.

As stated above, most of circumferential tubing section 88 is helically slit along its length. The primary purpose for the tubing is to draw the air out of chamber 72 uniformly during production of the vacuum. This is accomplished by means of the slits since the air will enter the tubing at all points along its length as indicated by the arrows 92 in FIG. 4a. The general idea of providing a distribution tube for pulling a vacuum at any point along its length is not in and by itself new. In the past, this has been accomplished utilizing tubing with longitudinally spaced holes provided through its tubing wall and even by means of porous rope. However, where foreign substances or adhesives such as the epoxy resin is used as in the present invention (as will be seen), after each use this foreign matter or adhesive tends to build up to a point sufficient to prevent a vacuum from being pulled therethrough. When this occurs with tubing having holes or with rope, these particular types of distribution means have to be replaced since it is extremely difficult to remove the foreign matter. However, in accordance with one aspect of the present invention, the vacuum distribution tubing disclosed herein includes the helical slits described above. These slits not only allow a vacuum to be pulled uniformly but can be easily opened for access therein to remove any foreign matter or adhesive buildup without replacing the entire tubing.

In order to assist the vacuum distribution tubing in pulling a vacuum within chamber 72, apparatus 10 includes a top sheet of conventional bleeder material 94 located against a separator sheet 95 which is against top wall 70a and a similar bottom sheet 96 located against a separator sheet 97 next to bottom wall 70b, as best seen in FIG. 7. These outer separator sheets can be of polyethylene or other suitable material. In addition, an inner separating sheet of material 98, for example polyethylene, is located inwardly of and against the sheet of bleeder material 94 while a similar separating sheet 100 is located inwardly of and against the bottom sheet of bleeder material 96. As will be seen hereinafter, these inner separating sheets are perforated for allowing a vacuum to be pulled in chamber 72 and for the passage of excess air and/or epoxy adhesive away from the surface of the skin laminates into the bleeder material, while the outer separating sheets are not perforated. These inner separator sheets also serve to separate the surfboard from the bleeder material. The outer separator sheets separate the bleeder material from the outer flexible walls 70a and 70b, so as to prevent the epoxy resin from adhering to the outer walls during the curing process and thereby allowing the flexible walls to be reused. This should be contrasted with conventional vacuum bag processes where the single sheet of bag material and associated bleeder and separator material is discarded after one use.

As stated previously, apparatus 10 includes two support members 50 which are sufficiently bendable to define a plurality of different curvatures in a given plane, specifically a vertical plane, including a predetermined curved surface of surfboard 10, specifically its underside surface. In order to bend these members and provide these different curvatures, apparatus 36 includes a plurality of bending mechanisms 102 associated with each support member for supporting the member and applying bending forces against it at spaced points along its length. As will be discussed in more detail hereinafter, each mechanism includes a turnbuckle or threaded rod adjustably movable in opposite directions vertically for applying a bending force in its direction of movement to its associated support member for causing a segment of that member to bend in response thereto. In this regard, it will be apparent that a conventional turnbuckle could be used in place of the threaded rod in the mechanism. Moreover, in accordance with the present invention, each bending mechanism includes means connecting its threaded rod to the bendable support member for limited pivotal movement vertically. In this way, when the bendable support members are caused to conform to a predetermined curvature, specifically the underside of the surfboard, a fair or natural curve can be provided utilizing each of the bending mechanisms (or turnbuckles when used). In addition, during adjustment of any one mechanism, the next adjacent mechanism and specifically its threaded rod will not tend to hang up as a result of misalignment or the torsional forces caused by the bendable support.

Figure 9:
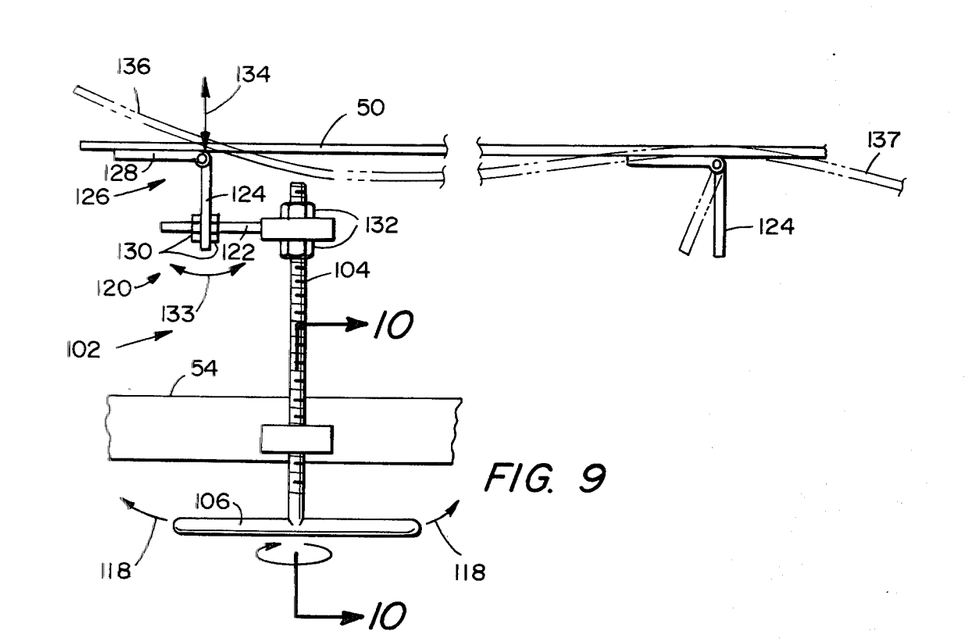
FIG. 9 is a vertical elevational view of a particular feature of the apparatus illustrated in FIGS. 5 and 6.
Figure 10:
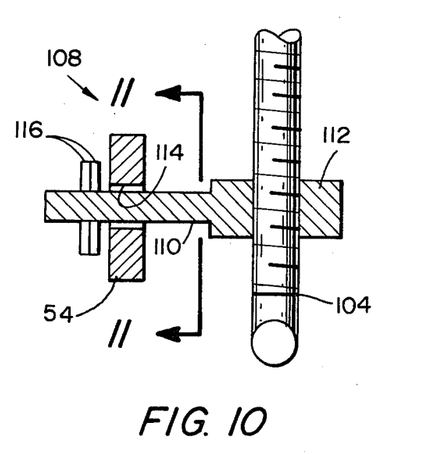
FIG. 10 is a sectional view taken generally along line 10—10 in FIG. 9.
Figure 11:
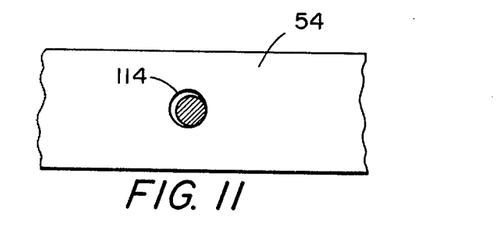
FIG. 11 is a sectional view taken generally along line 11—11 in FIG. 10.

Turning specifically to FIGS. 9 to 11, one of the bending mechanisms 102 is illustrated in detail. As seen best in FIG. 9, this mechanism includes the previously recited threaded rod which is generally indicated at 104. This rod extends vertically directly under an associated bendable support member 50 at an associated point along the length of the latter and includes a rotation handle 106 fixedly connected to its bottom end. The rod is supported in this position by a support arrangement 108 which is best illustrated in FIG. 10. As seen in this latter Figure, arrangement 108 includes a pivot rod 110 supporting at one end a threaded nut 112 through which rod 104 extends for vertical movement in response to rotation of handle 106. Rod 110 extends through an opening 114 in one of the previously described rigid support members 54 located directly under the bendable support member illustrated in FIG. 9. The rod 110 which is threaded at its otherwise free end is held within this opening by two jam nuts. As best illustrated in FIG. 11, opening 114 is sufficiently large to provide a slight clearance around rod 110 so as to allow a limited degree of pivotal movement of rod 110 within the opening of member 54 which, in turn, allows the threaded nut 112 and threaded rod 104 to pivot in a vertical plane as indicated by arrows 118 in FIG. 9.

As seen best in FIG. 9, the top end of threaded rod 104 is connected to bendable member 50 by means of an arrangement 120. This arrangement includes an eye bolt 122 having a threaded stem extending through a pivoting plate 124 comprising part of a hinge 126 which has a second plate 128 fixedly mounted to the underside of member 50. The threaded stem is held in place by a pair of nuts 130. The top end of rod 104 extends through the eye of bolt 122 in a slip-fit fashion and is maintained in this position by means of jam nuts 132. Note that this arrangement allows the rod 104 to move in the direction of arrows 118 (to a limited degree) as described above and as indicated by arrow 133.

Having described one of the bending mechanisms 102, attention is now directed to the manner in which they are used for bending an associated support member 50 to conform to a predetermined curvature. As a general rule it is best to start at one end of the bendable member and therefore the first bending mechanism selected would be one closest to an end cross-bar 52 (see FIG. 3). If it is necessary to raise that end section of the bendable bar then the threaded rod 104 is moved vertically upwards (by rotating handle 106 in the proper direction). By the same token, if it is necessary to lower the bendable support member at that point, it will be necessary to rotate the threaded rod downward. In either case, an upward or downward force is applied to the bendable support member at its point of connection with the bending mechanism, specifically at the hinge 126 as indicated by two-way arrow 134. As the threaded rod moves upward for example, an entire section of the support member 50 on both sides of hinge 126 moves upward, as indicated diagrammatically in FIG. 9 by dotted line 136.

At the same time, the next adjacent bending mechanism does not interfere with this movement (to a limited extent) so as to allow the bent section to take on a fair or natural curve. This is accomplished by allowing the threaded rod of the next adjacent bending mechanism and its associated hinge 126 to pivot slightly as indicated by the dotted line movement of the adjacent hinge plate 124. This limited degree of movement allows the bent section of the bendable support member to move up (as indicated at 136) while allowing the next adjacent section of the bendable support member on the other side of the next adjacent bending mechanism to follow a normal path downward, as indicated diagrammatically by dotted lines at 137. At the same time, this pivotal movement reduces the possibility of the next adjacent threaded rod to jam or otherwise hang up as a result of the torsional forces of the bending movement of section 136 of member 50.

After the first bending mechanism places its section of the support member in conformance with the predetermined curvature, the next adjacent bending mechanism is adjusted and so on down the line. Both support members 50 are adjusted in this way to conform to the desired curvatures. As will be discussed hereinafter, in an actual working embodiment, the two support members are conformed to the curvature of underside 14 of core 12 which, as described previously, comprises part of the overall surfboard 10. The reason for this will be discussed hereinafter.

Having described surfboard 10 and apparatus 36, attention is now directed to the manner in which the surfboard is constructed in accordance with the present invention. At the outset, the previously described core 12 having an underside 14 of predetermined curvature and a top side 16, also of predetermined curvature, is formed in a conventional manner. The top side of this core (or the bottom side or both) may be chambered as indicated at 18 by conventional means, as described above, in order to reduce its weight. The individual layers 24, 26, 28 and 30 making up the top and bottom sections of the outer skin construction 20 are appropriately positioned relative to one another and saturated with a bath of epoxy resin. In a preferred embodiment, the previously described perforations 32 in the two innermost layers 28 and 30 are initially provided.

As a first step in the utilization of apparatus 36, the entire assembly of adjustable bendable support bars 50 and its rigid support bars 54 is removable from frame 36 to allow the adjustment of the bendable support bars to conform to the bottom of the core or surfboard and then replaced and attached suitably to the vacuum frame 36 to allow support of the bottom of the core or surfboard during lamination. Alternatively, core 12 (alone) is positioned within chamber 72 so that its underside 14 is positioned directly over and rests against support members 50 so that the latter can be made to conform to the curvature of underside 14 in the manner described above. Once this has been done, the core is temporarily removed so that the bottom section of the resin impregnated outer skin construction is placed within the chamber directly over the precurved support members 50. The core is then positioned or repositioned over this section of the outer skin construction and the top resin impregnated section is thereafter placed over the core along with suitable separator sheets, bleeder material and bleeder tubing, all within the chamber 72. After this has been done, the topframe 56 is moved down against the bottom frame for sealing the chamber and a vacuum is drawn within the chamber through vacuum distribution tubing 86. This causes the flexible walls or vacuum bags 70a and 70b to draw tightly around the core and outer skin construction for causing the latter to conform to the curvature of the core and therefore provide the same curvature for the entire surfboard, that is, its outermost surface. In this regard, while the support members 50 are positioned outside the chamber, they are placed sufficiently close to the flexible wall 70b directly under the chamber so as to aid the flexible wall in causing the bottom section of the skin construction to conform to the curvature of underside 14. In this regard, it may be necessary to provide a downward force against the surfboard so as to force its underside against the support members. This can be accomplished manually, or as illustrated in FIG. 6, an appropriate device 140 can be provided with each member 68. In an actual working embodiment, this device includes a rubber hose or other such relatively soft member 142 which bears against the top side of the surfboard by a bolt arrangement 144.

However, any suitable means to provide this downward force could be readily provided.

As the vacuum within chamber 72 is drawn, causing the outer skin construction to conform to core 12, excess epoxy and air is drawn out from between the various layers through previously described openings 32 in the inner wood layers 28 and 30. This material passes out of the laminated skins into the bleeder material and into the vacuum distribution tubing. The remaining epoxy is cured so as to bond the layers of the outer skin constructions to each other to form a solid laminate and to bond the outer skins to the inner core. This may be accomplished in any suitable way. However, in an actual working embodiment, the entire apparatus as illustrated in FIG. 6 is positioned within a heated chamber diagrammatically indicated by dotted lines at 146. The epoxy is cured for approximately two hours at 150° F. while a vacuum pressure of 25 to 28" hg is provided. Direct solar radiation is also used to cure the adhesives. Obviously, these different parameters will vary depending upon the type of adhesive used. In any event, it should be quite apparent that the materials which make up the surfboard and which make up the apparatus should be selected to withstand the necessary curing temperatures.

As stated above, the two support members 50 are provided for aiding in conforming the bottom section of the outer skin construction to the underside 14 of core 12. However, these support members also serve to confirm that the end product, that is, the outermost surface of the surfboard does in fact have the desired curvature. Moreover, confirmation can be made not only after the surfboard has been completely cured, but at any prior point during the process and usually early in the process. It is particularly advantageous to do this before curing takes place so that corrections can be made to the underside, for example by the appropriate application of force at various points along its length.

After the surfboard completes the curing process a number of conventional finishing steps are required. One such step is to remove the epoxy which was drawn out through edge 20c between the two sections of the outer skin. Thereafter, this edge is covered by strip or strips 22 as described previously. The outer surface is then cleaned, sanded and saturated again with epoxy and finished with epoxy and/or compatible coatings.

From the foregoing, it should be apparent that an apparatus including the features described and its method of operation could be utilized to construct molded articles similar to the surfboard described such as the body of a windsurfboard, furniture, skis or the like, utilizing the principles of the present invention.

What is claimed is:

1. An apparatus for making a laminated article of predetermined curvature, said article including a central core having said predetermined curvature and a separate laminated outer skin construction surrounding said core, said apparatus comprising:
   (a) a housing arrangement defining a vacuum chamber adapted to recieve said central core and said laminated outer skin construction, said housing arrangement including outermost flexible wall means defining at least one side of said chamber;
   (b) means for creating a vacuum in said chamber whereby to draw said flexible wall means tightly around a section of said core and outer skin construction for causing the latter to conform to the curvature of said core section so as to provide the same curvature for the article itself; and
   (c) means located outside and on one side of said chamber for aiding said flexible wall means in causing a section of said skin construction to conform to a predetermined one of the curved surfaces of said core section, said aiding means including at least one elongated support member sufficiently bendable to define a plurality of different curvatures including said one curved surface of said core section in a given plane, said support member being positioned outside said chamber but sufficiently close to said outermost flexible wall means defining one side of said chamber so as to aid said flexible wall means in causing said section of said skin construction to conform to said one curved surface of said core section, said aiding means also including means for bending said member to any one of said curvatures in said plane and for maintaining it in the curvature selected.

2. An apparatus according to claim 1 wherein said housing arrangement includes flexible wall means defining opposite sides of said chamber and means supporting both of said flexible wall means for movement between first positions for closing said chamber and second positions for opening said chamber, whereby said flexible wall means can be reused in making a number of laminated articles.

3. An apparatus according to claim 1 wherein said aiding means includes two support members and respective bending means, said support members being located adjacent to and parallel with one another for aiding said flexible wall means in causing said section of said skin construction to conform to said one curved surface.

4. An apparatus according to claim 1 wherein said bending means includes a plurality of independent bending mechanisms for applying bending forces against said support member at associated points along its length, each of said mechanisms including
   (a) means adjustably movable in opposite directions in said given plane for applying a bending force in its direction of movement to said member at an associated point for causing a segment of said member to bend in response thereto, and
   (b) means connecting said force applying means to said bendable member at said associated point and supporting said last-named means for limited pivotal movement in said given plane.

5. An apparatus according to claim 1 wherein said article is a surfboard and said predetermined curved surface includes the bottom of said surfboard.

6. An apparatus according to claim 1 wherein said housing means includes inner flexible wall means located in said chamber adjacent to and extending across said outermost wall means, said inner wall means being perforated for allowing said vacuum to be drawn within said chamber and serving as a separating medium between said article and said outermost wall means.

7. An apparatus according to claim 1 wherein said vacuum creating means includes vacuum distribution tubing means located within said chamber, said tubing means being defined by a continuously slit helical wall whereby to allow a vacuum to be drawn through the wall of the tubing means along its length, said wall being sufficiently flexible whereby to provide access into said tubing means along its length.

8. An apparatus for making laminated article of predetermined curvature, said article including a central core having said predetermined curvature and a separate outer laminated skin construction surrounding said core, said apparatus comprising:
  (a) a housing providing a vacuum chamber adapted to receive said central core and said outer skin construction, said housing including a rigid frame structure and an outermost flexible wall which defines one side of said chamber;
  (b) means for creating a vacuum in said chamber whereby to draw said flexible wall tightly against a section of said core and outer skin construction for causing the latter to conform to the curvature of said core section so as to provide the same curvature for the article itself; and
  (c) means located outside and on one side of said chamber for aiding said flexible wall in causing a section of said skin construction to be conformed to a predetermined one of the curved surfaces of said core section, said aiding means including a pair of elongated, spaced apart but parallel support members, each of which is sufficiently bendable to define a plurality of different curvatures in an associated plane said curvatures including said predetermined curved surfaces of said core section each of said support members being positioned outside said chamber but sufficiently close to said flexible wall defining one side of said chamber so as to aid said flexible wall in cuasing said section of skin construction to be conformed to said predetermined surfaces, said aiding means also including means for bending each of said members to any one of said curvatures in its associated plane and for maintaining it in the curvature selected, each of said bending means including a plurality of independent bending mechanisms for applying longitudinally spaced bending forces against its associated support member.

9. An apparatus according claim 8 wherein said housing includes a second outermost flexible wall for defining the opposite side of said chamber from said first-mentioned flexible wall, said flexible walls being fixedly connected with said frame structure so as to be reusable in the making of said articles.

10. An apparatus for making a laminated article of predetermined curvature, said article including a central core having said predetermined curvature and a separate outer laminated skin construction surrounding said core, said apparatus comprising:
  (a) a housing defining a vacuum chamber adapted to recieve said outer laminated skin construction, said housing including first and second rigid frame structures pivotally connected to one another for relative movement between a closed position and an opened position and first and second flexible wall arrangements respectively connected with said first and second frame structures for defining opposite sides of said chamber, each of said flexible wall arrangements including an outermost fluid impervious flexible wall and a perforated inner wall;
  (b) means for creating a vacuum in said chamber whereby to draw said flexible wall arrangements tightly around opposite sides of said core and said outer skin construction for causing the latter to conform to the curvature of said core section so as to provide the same curvature for the article itself, said vacuum creating means including vacuum distribution tubing means located within said chamber, said tubing means being defined by a continuously slit helical wall whereby to allow a vacuum to be drawn through the wall of the tubing means along its length, said helical wall being sufficiently flexible whereby to provide access into said tubing means along its length; and
  (c) means located outside and on one side of said chamber for aiding said first flexible wall arrangement in causing an adjacent section of said skin construction to be conformed to predetermined ones of the curved surfaces of said core construction, said aiding means including a pair of spaced apart but parallel elongated support members sufficiently bendable to define a plurality of different curvatures including curvatures corresponding to said predetermined curved surfaces of said core section in a given plane, each of said support members being positioned outside said chamber but sufficiently close to said first flexible wall arrangement so as to aid the latter in causing said section of said skin construction to conform to said predetermined curved surfaces, said aiding means also including means for bending each of said members to any one of said curvatures in its associated plane and for maintaining it in curvature selected, said bending means associated with each of said member including a plurality of independent bending mechanisms for applying bending forces against its associated support member at associated points along its length, each of said mechanisms including means adjustably movable in opposite directions in said associated plane for applying a bending force in its direction of movement to its associated member at its associated point for causing a segment of the associated member to bend in response thereto, and means connecting said force applying means to said bendable member at said associated point and supporting said last named means for limited pivotal movement in its associated plane.

11. An apparatus for making a laminated article of predetermined curvature, said article including a central core having said predetermined curvature and a separate outer laminated skin construction surrounding said core, said apparatus comprising:
  (a) a housing defining a vacuum chamber adapted to receive said outer laminated skin construction, said housing including first and second rigid frame structures pivotally connected to one another for relative movement between a closed position and an opened position and first and second flexible wall arrangements respectively connected with said first and second frame structures for defining opposite sides of said chamber, each of said flexible wall arrangements including at least an outermost fluid impervious flexible wall;
  (b) means for creating a vacuum in said chamber whereby to draw said flexible wall arrangements tightly around opposite sides of said core and said outer skin construction for causing the latter to conform to the curvature of said core section so as to provide the same curvature for the article itself; and
  (c) means located outside and on one side of said chamber for aiding said first flexible wall arrangement in causing an adjacent section of said skin construction to be conformed to predetermined ones of the curved surfaces of said core construction.

12. An apparatus according to claim 11 wherein said aiding means includes a pair of spaced apart but parallel elongated support members sufficiently bendable to define a plurality of different curvatures including curvatures corresponding to said predetermined curved surfaces of said core section in a given plane, each of said support members being positioned outside said chamber but sufficiently close to said first flexible wall arrangement so as to aid the latter in causing said section of said skin construction to conform to said predetermined curved surfaces, said aiding means also including means for bending each of said members to any one of said curvatures in its associated plane and for maintaining it in the curvature selected, said bending means associated with each of said members including a plurality of independent bending mechanisms for applying bending forces against its associated support member at associated points along its length, each of said mechanisms including means adjustably moveable in opposite directions in said associated plane for applying a bending force in its direction of movement to its associated member at its associated point for causing a segment of the associated member to bend in response thereto, and means connecting said force applying means to said bendable member at said associated point and supporting said last named means for limited pivotal movement in its associated plane.

* * * * *